Dec. 1, 1964  R. D. WEST  3,159,133
VESSEL

Filed March 6, 1963  4 Sheets-Sheet 1

INVENTOR.
Robert D. West
BY
ATTORNEY

Dec. 1, 1964  R. D. WEST  3,159,133
VESSEL
Filed March 6, 1963  4 Sheets-Sheet 2
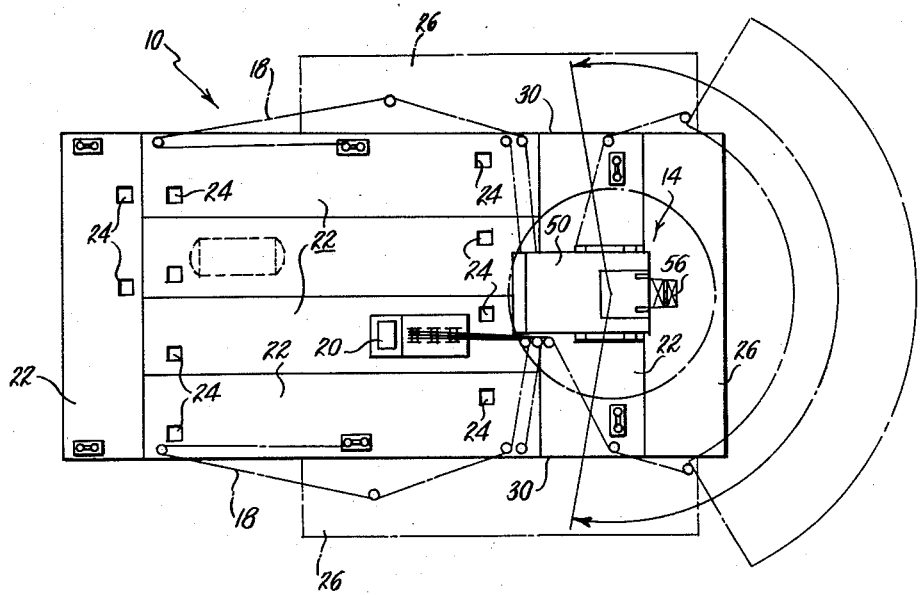
Fig. 2.
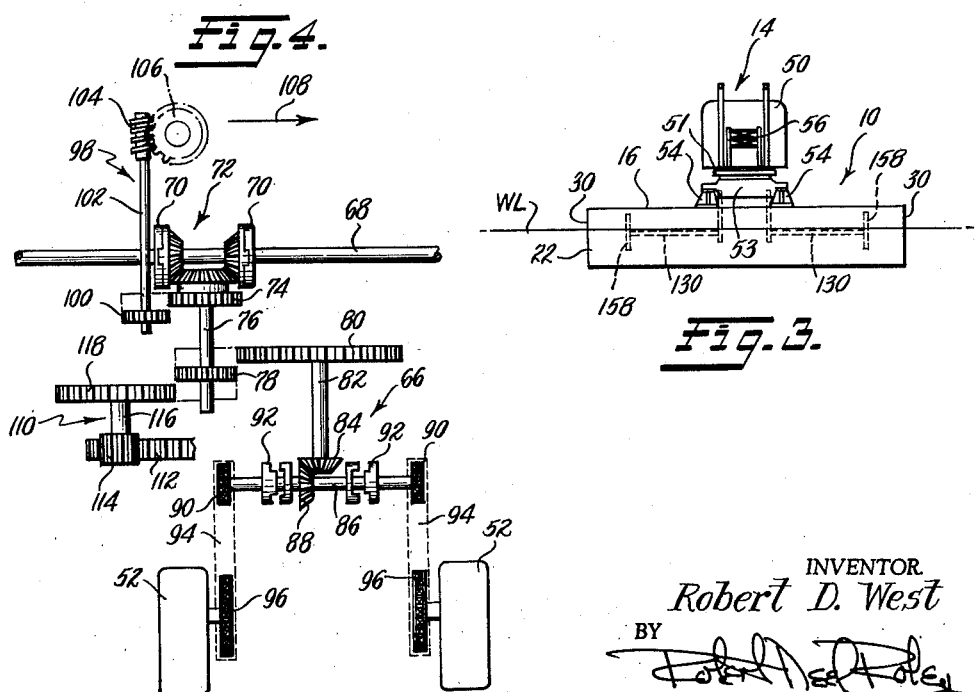
Fig. 4.
Fig. 3.
INVENTOR.
Robert D. West
BY
ATTORNEY Dec. 1, 1964  R. D. WEST  3,159,133
VESSEL
Filed March 6, 1963  4 Sheets-Sheet 3
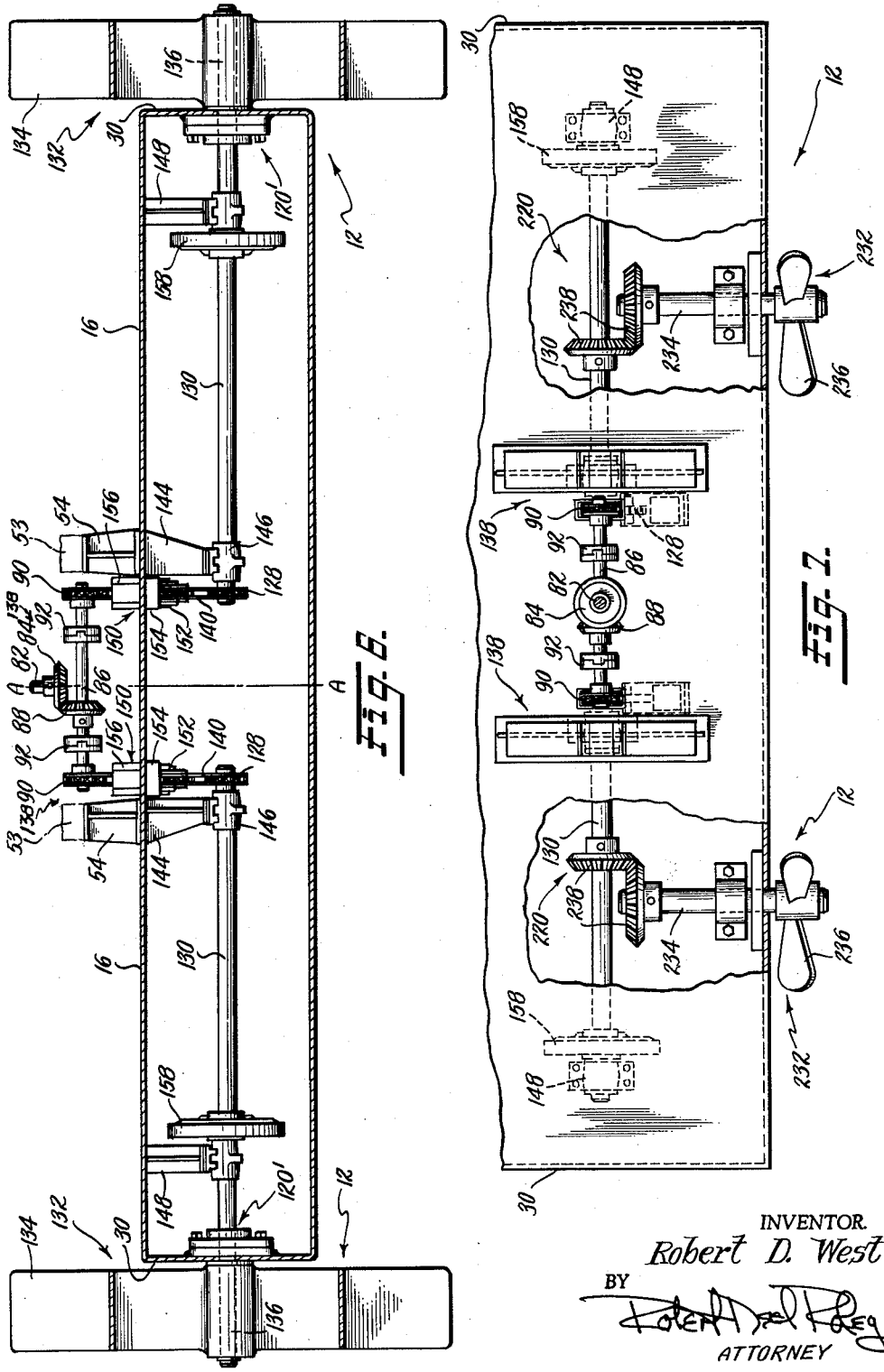
INVENTOR.
Robert D. West
BY
ATTORNEY

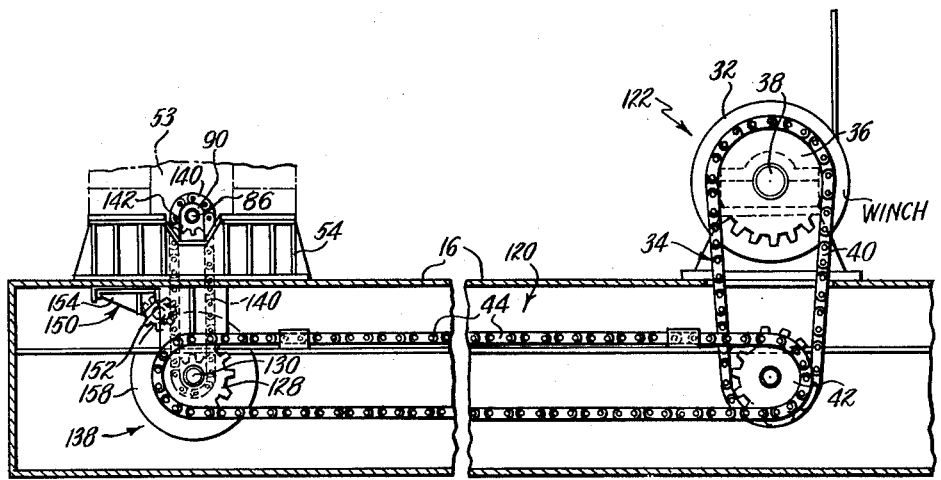
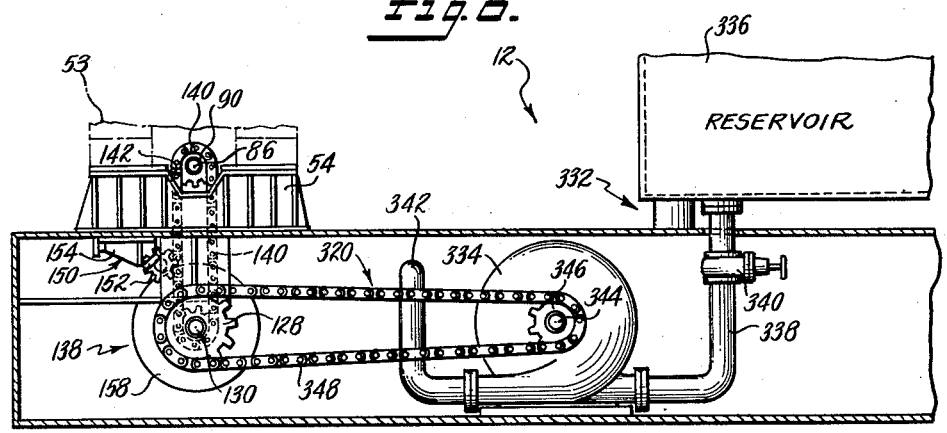
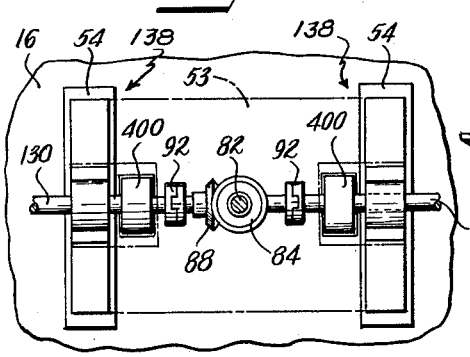
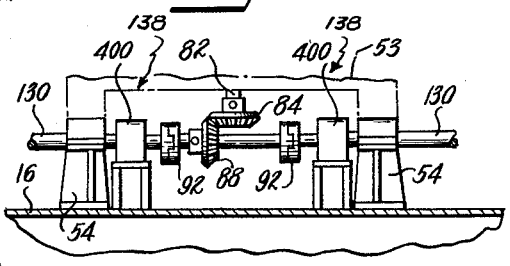

United States Patent Office 3,159,133
Patented Dec. 1, 1964

3,159,133
VESSEL
Robert Dunham West, Manitowoc, Wis., assignor to Manitowoc Shipbuilding Inc., Manitowoc, Wis., a corporation of Wisconsin
Filed Mar. 6, 1963, Ser. No. 263,268
19 Claims. (Cl. 115—.5)

This invention relates to apparatus for enabling the travel drive assembly of a mobile type crane unit to be effectively employed as a power source to drive, operate, position, power, move or in any other way actuate various types of equipment which may be employed on a vessel to accomplish a desired function, such as, for example, propulsion means, cargo or freight handling handling means, mooring or anchoring means, and the like.

This invention also relates to vessels having at least one piece of equipment for performing a desired function, and more particularly to a vessel such as a barge, dredge, scow, or the like, having a crane unit carried thereon with at least one piece of equipment being provided to propel, handle cargo or freight, moor, anchor, or any other one of many suitable desired functions, and improved apparatus for enabling such equipment to be powered, operated, positioned, moved, driven or in other ways actuated by an assembly of the crane unit in order for the equipment to perform the respective functions thereof, as desired.

This is a continuation-in-port of my copending application Serial No. 132,101, filed August 17, 1961, entitled Dredge, now U.S. Patent No. 3,086,305, issued April 23, 1963.

Vessels, such as a barge, dredge, scow or the like, which are provided with a crane unit that functions in a manner to dredge, drill, handle cargo or freight, etc., are also usually provided with types of equipment, certain ones of which may be classified as being of the auxiliary type, and this equipment may be employed to perform highly desired functions, such as propelling the vessel; anchoring, mooring, or otherwise securing the vessel in a desired location or position; cargo, freight and supply handling about the deck of the vessel; powering a hydrostatic system, to mention only a few of the possible functions that may be required to be employed in conjunction with the operation of the vessel.

Normally, each of the various types of equipment, whether auxiliary or not, as briefly mentioned above, are powered, driven, positioned, operated, moved or otherwise actuated by a separate and independent source of power which requires additional expense, maintenance, supervision and thus increases the operational costs of the vessel. Also, the crane units which have usually heretofore been employed with vessels such as barges, scows and dredges, have in most instances, been of the immobile or stationary type, creating a disadvantage since such a crane unit is limited in operation to function only when supported or mounted on the vessel or some other type of structure.

It has been found by actual practice that a mobile type crane unit, which is provided with a travel drive assembly for normally actuating crawler treads, may be mounted on a vessel of the type described and disclosed herein having equipment for performing certain desired functions, and the crawler treads of the crane unit may be removed therefrom and apparatus substituted therefor which enables the travel drive assembly of the crane unit to power, drive, position, move, operate, or otherwise actuate the various types of equipment, as desired.

In this way it is possible to eliminate from the vessel any need for additional special actuating means or independent sources of power for each piece of the equipment and it is also possible to employ the crane unit as a mobile type unit by merely replacing the crawler treads thereon so that there is a definite, desired advantage and unobvious result gained and acquired since such special additional actuating means or separate and independent source of power is not necessary and may be eliminated from the vessel and the crane unit may be effectively used and employed both on and off of the vessel without requiring other types of supporting structure.

Accordingly, it is an object of this invention to provide apparatus for enabling a travel drive assembly of a mobile type crane unit to power, drive, position, move, operate or otherwise actuate various types of equipment of a vessel on which the crane unit may be mounted.

It is also an object of this invention to provide a vessel, which comprises a mobile type crane unit having a travel drive assembly and a barge having various types of equipment mounted thereon for performing desired functions, with apparatus that enables the travel drive assembly of the crane unit to be employed to power, drive, position, move, operate, or otherwise actuate the various pieces of equipment of the barge, as required.

A further object of this invention is to provide an improved vessel which comprises a barge having at least one piece of equipment mounted thereon for performing a desired function, a mobile type crane unit having a travel drive assembly mounted on the barge, and apparatus for enabling the travel drive assembly of the mobile type crane unit to effectively power, drive, move, position, operate or otherwise actuate the equipment, as required.

Other objects and important features of the invention will be apparent from a study of the specification following, taken with the drawing, which together show, describe, illustrate and disclose certain preferred embodiments or modifications of the invention and what is now considered to be the best mode of practicing the principles thereof. Still other embodiments or modifications may be suggested to those having the benefit of the teachings herein, and such other embodiments or modifications are intended to be reserved especially as they fall within the scope and spirit of the subjoined claims.

In the drawing:

FIGURE 2 is a diagrammatic plan view of the vessel shown in FIGURE 1 and illustrating certain optional equipment which may be employed therewith in dot-dash lines and mooring, anchoring and securing equipment as well as showing the effective working areas of the crane unit for the various types of attachments;

FIGURE 3 is a schematic elevational view of the forequarters of the vessel taken along line 3—3 of FIGURE 1 looking in the direction of the arrows;

FIGURE 4 is a front elevational schematic view of a travel drive assembly of the crane unit illustrated in FIGURE 1;

FIGURE 5 is a schematic partial side elevational view, similar to FIGURE 1, illustrating one embodiment of propulsion type equipment which may be employed for moving the vessel and which may be powered, driven, positioned, moved, operated, or otherwise actuated through the apparatus of the invention by the travel drive assembly of the crane unit;

FIGURE 6 is an enlarged partial sectional view, taken along the line 6—6 in FIGURE 5, looking in the direction of the arrows, and illustrating the details of the apparatus of the invention;

FIGURE 7 is an enlarged partial plan view, with portions thereof being broken away, of the apparatus of the invention being employed to power, operate, position, move, drive or otherwise actuate another embodiment of propulsion type equipment which may be employed on the vessel;

FIGURE 8 is an enlarged partial side elevational view of the apparatus of the invention being employed to power, position, move, operate, drive or otherwise actuate load, supply, cargo or freight handling equipment which may be used with the vessel;

FIGURE 9 is an enlarged partial side elevational view of the apparatus of the invention being employed to power, operate, position, move, drive or otherwise actuate equipment of a hydrostatic system that might be used with the vessel;

FIGURE 10 is a partial elevational view, similar to FIGURE 6 of the drawing, illustrating a possible modification of the mechanism for powering, operating, positioning, moving, driving or otherwise actuating the various types of equipment, and FIGURE 11 is a plan view of the modification of the mechanism as illustrated in FIGURE 10.

Figure 1:
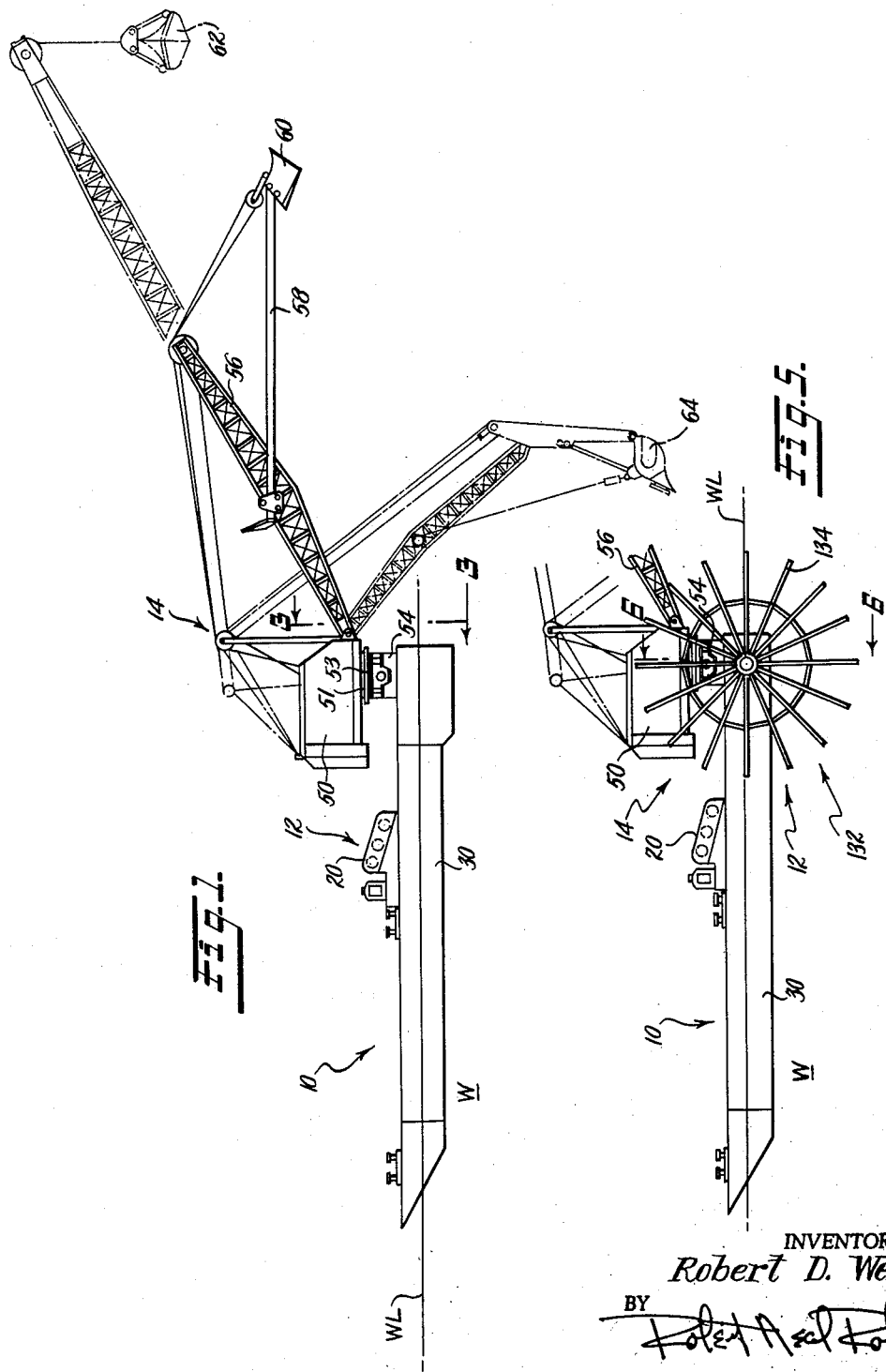
FIGURE 1 is a schematic side elevational view of a vessel having a mobile type crane unit mounted thereon and employing apparatus of the invention to power, drive, position, move, operate or otherwise actuate equipment which may be supported by the vessel and illustrating various types of attachments which may be used with the crane unit.

Attention is now directed to FIGURES 1, 2 and 3 of the drawing wherein there is illustrated a vessel 10 which may be a barge, scow, dredge, or some other similar type whereon there may be mounted a crane unit 14 generally employed for dredging, drilling, cargo or freight handling or any other suitable function. The vessel 10, as in normal conventional practice, is illustrated as being buoyantly supported by a body of water W having a water level WL.

The vessel 10 is provided with a deck 16 and suitable mooring lines 18 for manipulating, anchoring and in other ways controlling the vessel 10 with the mooring lines 18 being actuated by a winch 20 secured on the deck 16 of the vessel 10.

Further, the vessel 10 may comprise, if desired, a plurality of separate and independent sections 22 which are secured together by suitable known securing means and as illustrated, the vessel 10 is defined by certain ones, four as shown, of the sections 22 being disposed fore and aft or extending generally longitudinally relative to the vessel 10 with the sides thereof being secured together, with other ones of the sections 22, two as shown extending athwartships across the bow and the stern of the certain fore and aft extending sections 22. Each of the sections 22 may be provided with manholes 24 to enable access into the confines of the individual sections 22 for the propose of maintenance, repairs, etc.

If deemed necessary or if required, the vessel 10 may be provided with suitable optional equipment, such as pontoons 26, illustrated by dot-dash lines in FIGURE 2 of the drawing, which may be secured to the sections 22 and thus increase the capacity of the vessel 10.

Various types of equipment 12 may be provided on the vessel 10 for performing highly desirable functions and as illustrated in FIGURES 2 and 8 of the drawing, the equipment 12 may be in the form of anchoring, mooring or securing means and load, supply, freight or cargo handling means respectively, propulsion means as in FIGURES 5, 6 and 7 of the drawing, and as a hydrostatic system as shown in FIGURE 9 of the drawing.

In FIGURE 2 the mooring, anchoring or securing equipment 12 comprises the mooring lines 18 and the winch 20 which enable the vessel 10 to be moored anchored or in other ways secured as well as controllably moved, manipulated or positioned about a location as desired.

In FIGURE 8, the load, supply, cargo or freight handling equipment 12 comprises a winch 32 that may also be used for various other functions than cargo and freight handling or the like with the winch 32 being powered, operated, positioned, moved, driven or otherwise actuated through a mechanism 120 which comprises a drive device 34 having a drive sprocket 36 disposed in driving engagement with a rotatable shaft 38 of the winch 32, and the drive device 34 is in turn driven by an endless bodily flexible elongate drive element 40 in the form of a sprocket chain that is in driven engagement with a sprocket 42 driven through an endless bodily flexible elongate drive element 44, which may also be in the form of a sprocket chain, from an apparatus 138 in a manner which will be described and disclosed in more detail hereinafter.

It is to be understood that the winch 20 of the anchoring, mooring or securing equipment 12, as illustrated in FIGURE 2 of the drawing, may be powered, operated, positioned, moved, driven or otherwise actuated through a mechanism and drive device that is similar to the mechanism 20 and drive device 34, in a manner such as the drive arrangement for the winch 32 of the load, supply, cargo or freight handling equipment 12 as shown in FIGURE 8 of the drawing.

In FIGURES 5, 6 and 7 of the drawing, the propulsion equipment 12 is illustrated in the form of propulsion devices 132 and 232, respectively, thus enabling the vessel 10 to be classified as being of the self-propelled type.

In FIGURES 5 and 6, the propulsion device 132 comprises a pair of side mounted paddle type wheels 134—134, disposed adjacent the sides 30—30 of the vessel in outwardly spaced relationship, or outboard relative thereto, with each of the paddle type wheels 134—134 being rotatably mounted on a shaft 136. With the shafts 136 being in driven engagement with the apparatus 138 through a mechanism 120' which may be any suitable known type of power transfer device and the driven engagement between the shafts 136 and the apparatus 138 is effective to drive, power, operate or in other ways actuate the paddle wheels 134—134 in a manner which shall be described and disclosed in more detail hereinafter.

The propulsion equipment 12 as shown in FIGURE 7 of the drawing comprises a pair of propeller shafts 234—234 rotatably journaled on the vessel 10 to laterally opposite sides of the longitudinally extending centerline A—A thereof with each of the shafts 234 being provided with a propeller blade 236. The shafts 234—234 are each powered, operated, positioned, moved, driven or otherwise actuated through mechanism 220 comprising a drive device 238 which may be in the form of bevel gearing that is in driven engagement with the apparatus 138 as will be described and disclosed in more detail hereinafter.

The equipment 12 that is illustrated in FIGURE 9 of the drawing comprises a hydrostatic system 332 which may be employed for functions such as hydraulic mining or even a jet type propulsion of the vessel 10 and the hydrostatic system 332 preferably comprises a variable displacement type pump device 334 supplied with suitable working fluid from a reservoir 336 through conduit means 338, control valving 340 and discharge conduit means 342 that places the pump device 334 in communication with any type of fluid responsive hydraulic operable units, not shown, from which the working fluid is returned to the reservoir 336 to complete the closed working fluid circuit. The pump device 334 of the hydrostatic system 332 is powered, operated, positioned, moved, driven or otherwise actuated through a mechanism 320 that comprises a rotatable impeller shaft 344 having a drive sprocket 346 driven by an endless bodily flexible elongate drive element 348 that may be in the form of a sprocket chain that is in driven engagement with the apparatus 138 in a manner which will be described and disclosed in more detail hereinafter.

The crane unit 14 is preferably one of the mobile type which is usually provided with rotatably mounted upper works 50, lower works 51 and a car body 53 to which there is normally mounted crawler treads 52—52.

As illustrated in FIGURES 1, 2 and 3 of the drawing, the crane unit 14 is mounted on the vessel 10 by mounting means 54 in the form of benches or some other suitable type of structure which supports the car body 53 of the crane unit 14 at a location which may be in the forequarters of the vessel 10 adjacent the bow thereof generally along the longitudinal extending centerline A—A with the crawler treads 52—52 of the crane unit 14 being removed. However, special situations may require that the crane unit should be mounted on the vessel 10 at some location other than that illustrated in the drawing.

As illustrated in FIGURE 1 of the drawing, the crane unit 14 may also be provided with structure that may be in the form of pivotally mounted boom structure 56 which may be further provided with a selected one of the conventional types of attachment, such as a dipper stick 58 and a shovel 60, as illustrated by solid lines in FIGURE 1 of the drawing, a clam shell 62 or back hoe 64, as illustrated by dot-dash lines in FIGURE 1 of the drawing, or only a boom which functions as a liftcrane, not illustrated.

The mobile type crane unit 14 is further provided with a travel drive assembly 66, as illustrated in FIGURE 4 of the drawing, which comprises a main drive shaft 68 driven by a power source, not illustrated, of the crane unit 14, with the main drive shaft 68 driving through clutch devices 70—70 and a bevel gear arrangement 72 which in turn drives through a spur gear 74, a slide pinion shaft 76 and a slide pinion 78 to a main travel gear 80 which is mounted for rotation with a vertical travel shaft 82 having a bevel gear 84 which is also mounted for rotation with the main travel gear 80 and the vertical travel shaft 82.

An elongated horizontally disposed travel drive shaft 86 is provided, intermediate the end portions thereof, with a bevel gear 88 driven by the bevel gear 84 of the vertical travel shaft 82 and adjacent each end portion of the horizontal travel drive shaft 86 there is mounted drive members 90, in the form of sprockets. A suitable clutch device 92 is provided on the horizontal travel drive shaft 86 intermediate the bevel gear 88 and each one of the drive sprockets 90. In conventional practice, the drive sprockets 90 are each drivingly connected to the crawler treads 52—52 through suitable crawler drive elements or chains 94—94 and driven members 96—96, in the form of sprockets, with the clutch devices 92—92 being effective for usually controlling the actuation of the crawler treads 52—52 to steer the mobile crane unit 14 as desired.

FIGURE 4 of the drawing also schematically illustrates an arrangement of other assemblies which are normally employed in controlling the various different functions of the crane unit 14, such as a boom hoist assembly 98 driven through a pinion 100, a boom hoist shaft 102 and a worm gear 104 to rotate a boom hoist drum 106 having a hoist line 108 reeved thereon. The crane unit 14 may also be provided with a swing assembly 110 which includes a ring gear 112 engaging a swing pinion 114 secured to a swing shaft 116 having a swing gear 118. The boom hoist assembly 98 and the swing assembly 110 are illustrated for the sole purpose of clarity and each may be of conventional construction and arrangement.

Each of the various types of equipment 12, as stated above, may be powered, driven, positioned, moved, operated or otherwise actuated by the respective mechanisms 120, 120', 220, 320, from the apparatus 138 through drive shafts 130 which, as illustrated in FIGURES 3, 6, 7, 8 and 9 of the drawing, are substantially axially aligned and spaced apart and extend generally athwartships or laterally relative to the vessel 10 from subjacent the drive members 90 of the travel drive assembly 66 outwardly from the longitudinally extending centerline A—A toward the respective sides 30—30, with the drive shafts 130 being disposed below the deck 16 of the vessel 10 within the confines of the section 22 which supports the mobile type crane unit 14 on the vessel 10.

As described and disclosed above, it is preferable that the crane unit 14 be of a mobile type since certain definite desired advantages and unforeseen unobvious results may be acquired if a mobile type crane unit is employed in combination with the vessel 10. For example, if a stationary or immobile type of crane unit is employed, then the owner or operator of the vessel 10 is limited in the use of the stationary or immobile crane unit since such crane unit can only be used in conjunction with the vessel 10 or some other type of support. Further, such stationary or immobile types of crane units do not normally include an assembly such as the travel drive assembly 66 and it is then necessary that some type of an additional separate or independent source of power be used to drive, move, operate, position, power or otherwise actuate the equipment 12 through the respective mechanisms 120, 120', 220 or 320.

Accordingly, it has been discovered that the advantages and desired unforeseen and unobvious results, briefly mentioned above, may be acquired and the disadvantages of the other arrangements may be eliminated by securing the mobile type crane unit 14 on the benches 54—54 of the vessel 10 and removing the crawler treads 52—52 from the crane unit 14 and effectively employing the travel drive assembly 66 of the crane unit 14 to drive, power, operate, position, move or otherwise actuate the mechanism 120, 120', 220 or 320, as the case may be, through the apparatus 138 in a manner and style now to be described and disclosed.

Having removed the crawler treads 52—52 and certain other parts associated therewith from the travel drive assembly 66 of the crane unit 14 and with the crane unit 14 being supported by the benches 54—54, the apparatus 138 is operationally interconnected between the travel drive assembly 66 and the respective horizontally disposed travel drive shafts 130 with the apparatus 138 comprising endless bodily flexible drive elements 140 in the form of drive chain devices which engage the respective drive sprockets 90 which are rotatably mounted on the horizontal travel drive shaft 86 and the respective driving sprockets 128 that are rotatably mounted for rotation with the drive shafts 130.

In actual practice it has been found that the drive members 90 and the crawler drive elements 94 of the travel drive assembly 66 may be employed and used as the drive members 90 and the endless chain drive devices 140 of the apparatus 138. However, it is to be understood that if required the drive members 90 and the drive elements or devices 94 and 140 may be of different structure.

The benches 54—54 are provided with a recessed portion 142 for the purpose of clearance and a shaft support 144 depends therefrom below the deck 16 of the vessel 10 with the respective shaft support 144 being provided with a journal 146 for one end portion of the respective horizontally disposed drive shaft 130 with the other end portion of the respective drive shaft 130 being journaled in bracket structures 148.

A take-up device 150 comprising an idler sprocket 152 is provided for each of the chain drive devices 140 with the respective idler sprocket 152 being journaled to and movably mounted below the deck 16 of the vessel 10 by a depending adjustable bracket structure 154 which is movably mounted in a manner to maintain the chain drive device 140 taut.

A suitable chain device guide and guard housing 156 is provided for each of the chain drive devices 140 adjacent that portion thereof which passes through the deck 16 of the vessel 10.

Intermediate the end portions of each of the horizontally disposed drive shafts 130, and as illustrated in FIGURES 3, 6, 7, 8 and 9 of the drawing, positioned adjacent to the respective journal bracket 148, there is provided a suitable brake device 158 for controlling the rotation of the respective drive shaft 130 during the driving, moving, positioning, operating, powering or actuation of the mechanisms 120, 120', 220 or 320, as required.

By providing the vessel 10 with the apparatus 138 which enables the travel guide assembly 66 of the crane unit 14 to actuate the mechanism 120, 120', 220 or 320, to move, position, operate, power or drive the respective equipment 12, as desired and required, the crane unit 14 may also operate in accordance with a job requirement.

As illustrated in FIGURES 10 and 11 of the drawing, if desired, the various mechanisms 120, 120', 220, 320, of the respective equipment 12, i.e., the winches 20 and 122, the propulsion devices 132, 232, and the hydrostatic system 332; as well as the drive shafts 130, may be located above the deck 16 of the vessel 10 and powered, driven, operated, positioned, moved or otherwise actuated by the apparatus 138 directly from the horizontal travel drive shaft 86 of the crane unit 14 through any suitable conventional type of drive connection 400.

It is to be understood that in each instance the powering, driving, moving, positioning, operation or actuation of the respective equipment 12 may be controlled by a single lever type of control, not illustrated, and if desired, the respective equipment 12 may be separately and independently powered, positioned, moved, driven, operated or actuated by such a single control type lever. In operation, the power source, not illustrated, of the crane unit 14 drives the main drive shaft 68, which in turn drives the main travel gear 80 through the bevel gear arrangement 72, the spur gear 74, the slide pinion shaft 76 and the slide pinion 78. Rotation of the main travel gear 80 imparts rotation to the vertical travel shaft 82 which, through the bevel gears 84 and 88 rotates the horizontal travel drive shaft 86.

The selective engagement or disengagement through the controls of the crane unit 14 of the clutch devices 92—92 drives the respective drive shafts 130 through the respective drive members 90, the endless chain drive device 140 and the driven member 128 with the endless chain drive device 140 being maintained taut by reason of the respective take-up device 150 or through the drive connection 400.

While the invention has been described in terms of several embodiments which it has assumed in practice, the scope of the invention should not be deemed to be limited by the precise embodiments herein shown, described, illustrated and disclosed, such other embodiments or modifications being intended to be reserved especially as they fall within the scope of the claims here appended.

I claim as my invention:

1. A vessel comprising, in combination,
   equipment mounted on the vessel for performing at least one desirable function,
   a mobile type crane unit having a travel drive assembly provided with a driving member,
   mounting means for mounting the crane unit on the vessel,
   mechanism for powering said equipment,
   a drive shaft rotatably journaled on said vessel,
   said drive shaft having a driven member secured thereto for rotation therewith,
   said drive shaft also being in driving engagement with the mechanism for powering the equipment, and
   apparatus for enabling the travel drive assembly of said crane unit to drive the drive shaft and actuate said mechanism,
   said apparatus comprising an endless drive element,
   said endless drive element being in driving engagement with the driven member on the drive shaft and in driven engagement with the driving member of the travel drive assembly.

2. The vessel as set forth in claim 1 together with a brake device for said drive shaft,
   said brake device being disposed in operating engagement with the drive shaft and effective for controlling the rotation thereof.

3. The vessel as set forth in claim 1 wherein said drive shaft is journaled and disposed belowdeck of the vessel, and guide-guard housings are provided abovedeck for that portion of the drive element which may extend abovedeck of the vessel.

4. The vessel as set forth in claim 1 wherein said apparatus further comprises a take-up device for the endless drive element,
   said take-up device comprising
   a bracket movably supported by the vessel and an idler member rotatably carried by the bracket in engagement with the endless drive element.

5. A vessel comprising, in combination,
   equipment carried by the vessel for performing at least one desired function,
   a mobile type crane unit having a travel drive assembly provided with a driving member,
   mounting means for mounting the crane unit on the vessel mechanism for operating the equipment,
   a drive shaft rotatably journaled on said vessel,
   said drive shaft having a driven member secured thereto for rotation therewith,
   said driven member being in driving engagement with the mechanism for operating the equipment, and
   apparatus for enabling the travel drive assembly of said crane unit to drive the drive shaft and actuate said mechanism,
   said apparatus comprising an endless drive element,
   said endless drive element being in driving engagement with the driven member on the drive shaft and in driven engagement with the driving member of the travel drive assembly.

6. The vessel as set forth in claim 5 wherein said equipment comprises a winch.

7. The vessel as set forth in claim 5 wherein said equipment is defined by a hydrostatic system.

8. The vessel as set forth in claim 5 wherein said equipment comprises a device for propelling said vessel.

9. The vessel as set forth in claim 8 wherein said device comprises a pair of paddle wheels, one disposed to each side of the vessel in outboard spaced relationship to the adjacent side thereof.

10. The vessel as set forth in claim 8 wherein said device comprises a propeller shaft rotatably journaled on the vessel and having propeller blade structure secured thereto for rotation therewith.

11. The vessel as set forth in claim 8 wherein said device comprises a pair of propeller shafts disposed to opposed sides of the longitudinally extending centerline of the vessel and rotatably journaled thereon, and a propeller blade structure secured to each of said shafts for common rotation therewith.

12. A vessel comprising, in combination,
    equipment for performing a desired function,
    a mobile type crane unit having an upper works rotatable about a generally vertical axis,
    said upper works having boom structure pivotally mounted thereon for movement about a generally horizontal axis and a travel drive assembly for normally driving the crane unit along the ground,
    said travel drive assembly having a generally vertically disposed travel shaft,
    mounting means for mounting the crane unit on the vessel,
    mechanism for operating the equipment,
    said mechanism comprising a drive shaft rotatably journaled on said vessel,
    said drive shaft having a driven member secured thereto for rotation therewith,
    said driven member of the drive shaft being in driving engagement with the mechanism, and
    apparatus for enabling the travel drive assembly of the upper works of said crane unit to drive the drive shaft and said mechanism,
    said apparatus comprising a drive element for said drive shaft,
    said drive element being in driving engagement with the drive shaft and in driven engagement with the travel shaft of the travel drive assembly.

13. A vessel comprising, in combination,
equipment for performing a desired function,
a mobile type crane unit having an upper works rotatable about a generally vertical axis,
said upper works having boom structure pivotally mounted thereon for movement about a generally horizontal axis and a travel drive assembly for driving the crane unit along the ground,
said travel drive assembly having a generally vertically disposed travel shaft,
mounting means for mounting the crane unit on the vessel,
mechanism for operating the equipment,
said mechanism comprising a drive element and an elongate drive shaft,
said drive shaft being in driving engagement with the mechanism, and
apparatus for enabling the travel drive assembly of the upper works of said crane unit to drive the drive shaft and actuate said mechanism to operate the equipment,
said apparatus comprising a drive element for said drive shaft,
said drive element of the apparatus being in driving engagement with the drive shaft and in driven engagement with the travel shaft of the travel drive assembly.

14. A vessel comprising, in combination,
equipment for performing a desired function,
a mobile type crane unit having a rotatably mounted upper works which is provided with pivotally mounted elongate structure and a travel drive assembly,
mounting means for mounting the crane unit on the vessel,
mechanism for operating the equipment, and
apparatus for enabling the travel drive assembly of the upper works of said crane unit to actuate said mechanism.

15. In combination with a vessel having equipment thereon for performing a desired function
and mechanism for operating said equipment
and an elongate drive shaft in driving engagement with the mechanism;
a mobile type crane unit having a rotatably mounted upper works provided with structure pivotally mounted thereon and a travel drive assembly carried thereby,
said travel drive assembly comprising a driving member,
mounting means for mounting the crane unit on the vessel, and
apparatus for enabling the travel drive assembly of the upper works of said crane unit to power the drive shaft and actuate said mechanism to operate the equipment,
said apparatus comprising a drive element for said drive shaft,
said drive element of said apparatus being in driving engagement with the drive shaft and in driven engagement with the driving member of the travel drive assembly.

16. In combination with a vessel having equipment mounted thereon for performing a function and mechanism for operating the equipment;
a crane unit having a rotatably mounted upper works which is provided with a travel drive assembly for driving the crane unit along the ground,
said travel drive assembly comprising a generally vertically disposed travel shaft,
mounting means for mounting the crane unit on the vessel, and
apparatus for enabling the travel shaft of the travel drive assembly of the upper works of said crane unit to actuate said mechanism.

17. In combination with a vessel having equipment mounted thereon for performing a desired function and mechanism for operating said equipment;
a crane unit having a rotatable upper works provided with a travel drive assembly,
apparatus for actuating said mechanism,
said apparatus comprising the travel drive assembly of the upper works of said crane unit, and
means for mounting the crane unit on the vessel.

18. In combination,
a vessel having equipment mounted thereon for performing a function,
a crane unit having a rotatably mounted upper works provided with a travel drive assembly carried by the vessel, and
apparatus for enabling the travel drive assembly of the upper works of the crane unit to power the equipment.

19. A vessel having equipment mounted thereon for performing a desired function,
a crane unit having a rotatably mounted upper works provided with a travel drive assembly,
said travel drive assembly having a generally vertically disposed travel shaft,
means for mounting the crane unit on the vessel, and
apparatus for enabling the travel shaft of the travel drive assembly of the upper works of the crane unit to operate the equipment.

References Cited by the Examiner
UNITED STATES PATENTS

| 881,008 | 3/08 | Knut | 115—0.5 |
| 1,484,109 | 2/24 | Beatty | 115—0.5 |
| 2,276,193 | 3/42 | Hanley | 115—14 |
| 3,086,305 | 4/63 | West | 37—73 |

MILTON, BUCHLER, *Primary Examiner.*

ANDREW H. FARRELL, *Examiner.*